United States Patent [19]
Sarro

[11] Patent Number: 5,280,131
[45] Date of Patent: Jan. 18, 1994

[54] FLUID-FILLED ELECTRIC POWER CABLE SYSTEM WITH TWO-WAY PISTON CHECK VALVE

[76] Inventor: Claude A. Sarro, 119 Northumberland Gate, Lynbrook, N.Y. 11563

[21] Appl. No.: 990,732

[22] Filed: Dec. 15, 1992

Related U.S. Application Data

[62] Division of Ser. No. 909,002, Jul. 6, 1992.

[51] Int. Cl.$^5$ .............................................. H01B 9/06
[52] U.S. Cl. ................................. 174/15.6; 137/498; 137/516.25; 174/21 R; 174/22 R
[58] Field of Search ..... 174/15.6, 21 R, 22; 137/498, 137/516.25

[56] References Cited

U.S. PATENT DOCUMENTS

| | | | |
|---|---|---|---|
| 786,667 | 4/1905 | Neumann | 137/460 |
| 820,598 | 5/1906 | Petersen | 137/460 |
| 1,394,332 | 10/1921 | Myer | 137/460 |
| 1,777,060 | 9/1930 | Welcker | 137/460 X |
| 1,956,010 | 4/1934 | Diescher | 137/220 |
| 1,969,721 | 8/1934 | Bennett | 174/11 R |
| 1,975,075 | 10/1934 | Bennett | 174/11 R |
| 2,121,936 | 6/1938 | Thomas | 137/498 |
| 2,433,505 | 12/1947 | Bennett et al. | 174/11 R |
| 2,623,725 | 12/1952 | Sands | 137/516.2 S |
| 3,085,589 | 9/1963 | Sands | 137/516.2 S X |
| 3,561,471 | 2/1971 | Sands | 137/498 |
| 3,683,957 | 8/1972 | Sands | 137/498 X |
| 3,798,345 | 3/1974 | Priaroggia et al. | 174/15.6 X |
| 4,811,756 | 3/1989 | Hall | 137/498 |
| 5,207,243 | 5/1993 | Sarro | 174/22 R X |

OTHER PUBLICATIONS

Designer's Handbook for Forced-Cooled High-Pressure Oil-Filled Pipe-Type Cable Systems, Underground Systems, Inc.—Jul. 1984 Cover Page, pp. 1-7 to 1-8; 1-17 to 1-25.

*Primary Examiner*—Morris H. Nimmo
*Attorney, Agent, or Firm*—Brooks Haidt Haffner & Delahunty

[57] ABSTRACT

A two way fluid flow check valve includes a plug movable reciprocally lengthwise of the valve against either of respective valve seats within a valve housing. A fixed partition which acts as a piston is located within a cylindrical cavity of the plug. The plug is slidable on a pair of hollow tubes centrally of the housing, the tubes supporting the fixed partition therebetween. The tubes provide respective fluid passages from either end of the housing into the plug cavity on the opposite side of the partition. Upon leakage in the pipe on either side of the valve, the plug will move in response to internal and external fluid pressures from the opposite side, towards the direction of lowered fluid pressure, and will seat against a mating valve seat at that end of the housing, thereby closing the valve. When the leak is repaired and the line pressure is restored, the valve will automatically reopen in response to renewed fluid pressure within the plug cavity on the one side of the fixed partition and the bleeding of fluid from the cavity on the opposite side of the partition, until equalized pressure obtains.

5 Claims, 3 Drawing Sheets

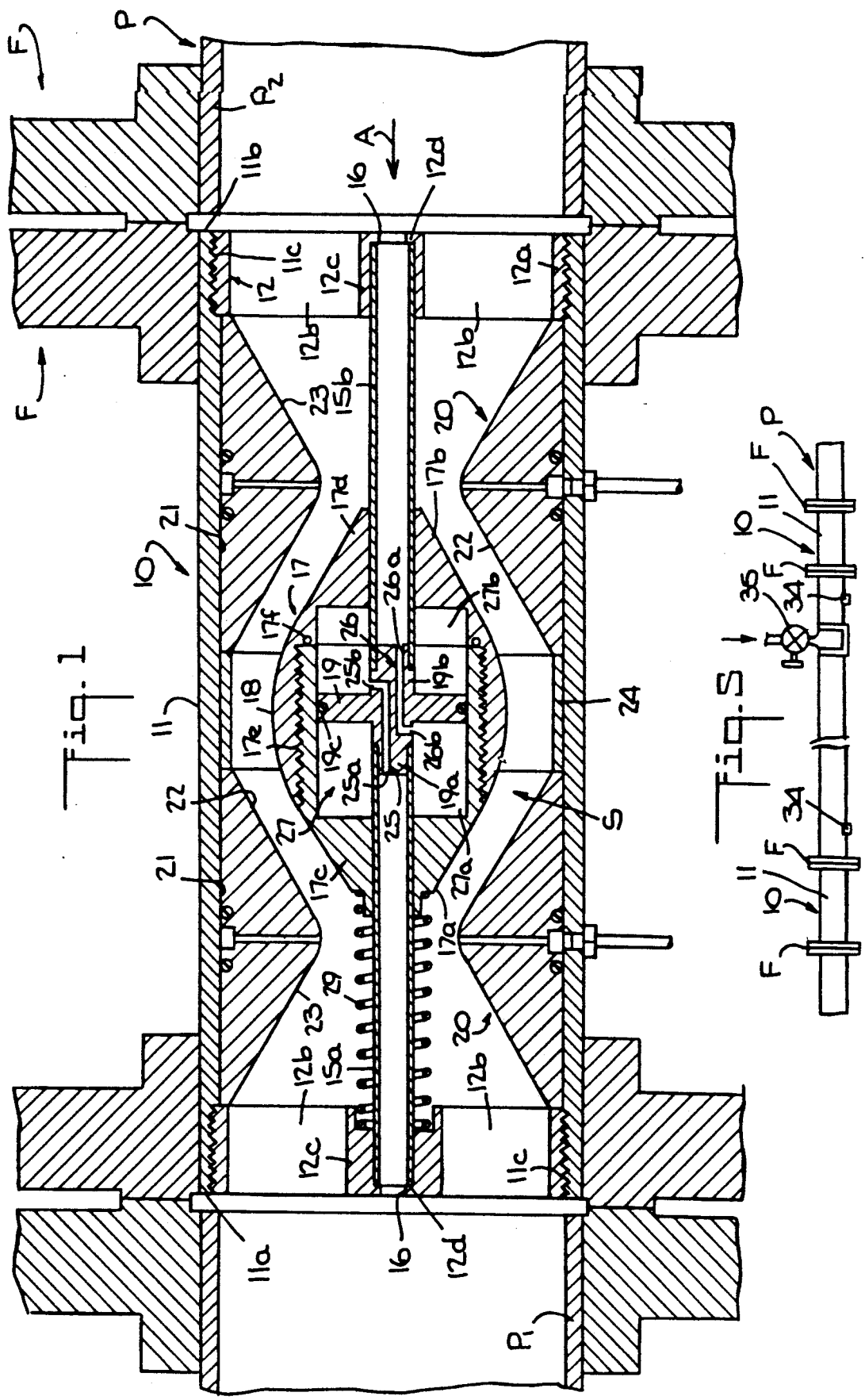

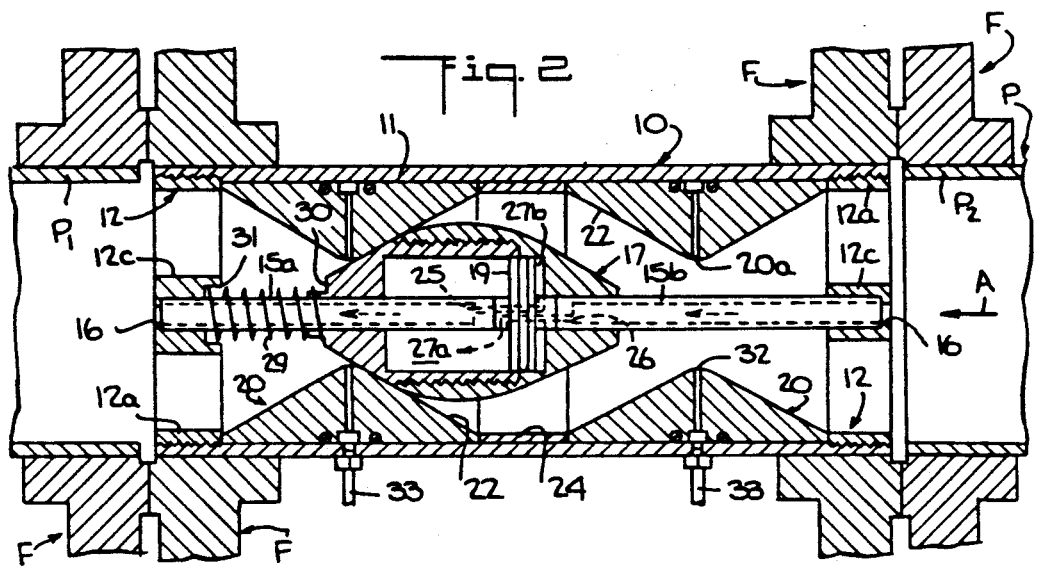
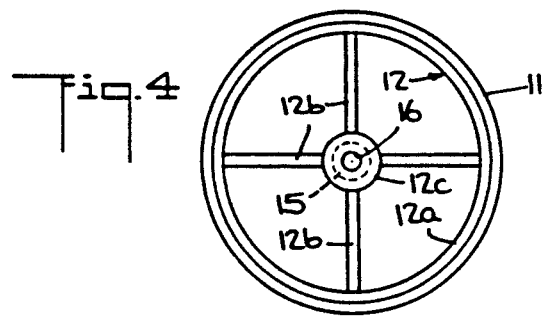
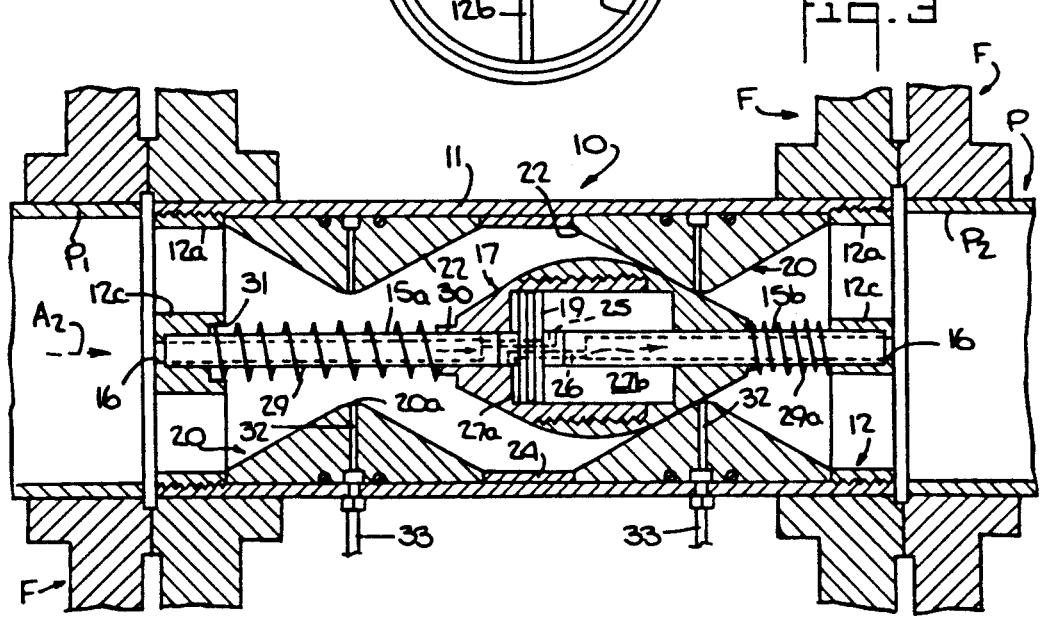

FLUID-FILLED ELECTRIC POWER CABLE SYSTEM WITH TWO-WAY PISTON CHECK VALVE

This application is a division of application Ser. No. 07/909,002, filed Jul. 6, 1992.

FIELD OF THE INVENTION

The invention is in the field of fluid flow check valves. More particularly, it relates to a two-way check valve as may be used to provide automatic cutoff of fluid flow in the event of pipeline rupture or leakage on either side of the valve.

BACKGROUND OF THE INVENTION AND THE PRIOR ART

Although it may have other uses, the fluid check valve of the invention is intended to provide leak protection in oil-cooled electric feeder cable piping systems. High-power electric feeder cables operating at, for example, 370 kv (kilovolts) become heated during use and it is therefore conventional to encase the cable in piping to create a path through the cable for slow circulation of dielectric oil to cool it. The oil is under high pressure, usually on the order of 200 psi (pounds per square inch). Such oil-filled electric power cable usually extends considerable distances overland, or buried in the ground to provide electric service to factories, homes and other places. If the cable becomes damaged with resulting rupture and leakage of the oil, not only will the cable begin to overheat but the seepage and loss of oil may create other well known difficulties. Moreover, replacement of lost oil involves considerable expense. It is therefore conventional to provide cooling oil stop joints at particular locations along the cable distance, such as at transfer points, so as to isolate the sequential lengths of the cooling system from each other. Thus, leakage occurring at any location along the feeder cable is localized for easier detection and repair, and for limiting the loss of oil.

However, usually all of the oil in any such isolated cable length is lost upon leakage occurring anywhere along that length. Thus, because these conventional stop joints are located at the cable transfer points the distances between them are relatively long. Accordingly, it is difficult to isolate and locate the point of the leakage, because all of the considerable length of cable between any two stop joints must be inspected.

Electrical cables, cooled by flow of oil under pressure, which employ conventional stop joints at spaced locations along the cable to divide the cable into sections that can be isolated from each other to prevent drainage of the entire cable in the case of a break or leakage in one cable section, and which have bypass pipes equipped with valves at the stop joints, are shown in Bennett U.S. Pat. Nos. 1,975,075 and 1,969,721, granted in 1934. The disclosures of these patents are incorporated herein by reference for their showing of stop joints and valved bypass pipes in conjunction with oil-cooled electrical cables.

It would obviously be advantageous if many more stop joints could be provided along the entire distance of the feeder transmission, so as to permit better pinpointing of any leakage location. However, such has not been possible using conventional one-way stop valves as stop joints, because flow continues through all the valves on the upstream side of the leak until pumping is discontinued.

The two-way check valve of this invention provides such advantage. That is, it is operable to close in either direction in response to rupture or significant leakage occurring in the fluid-carrying conduit on either its upstream side or its downstream side, and the valve will automatically reopen when normal pressure or flow conditions have been reestablished within the conduit. This fully automatic operation permits the valve to be located at remote or otherwise inconveniently accessible locations within the line, permitting comparatively short lengths of cable between such check points. Moreover, it can be installed in any valve orientation, whether vertical, horizontal, or at any angle to the horizontal, yet it will still operate dependably in the intended manner.

BRIEF DESCRIPTION OF THE INVENTION

Briefly and generally describing a two-way check valve in accordance with the invention, it comprises an outer tubular housing which can be attached within the stop joint bypass pipe of an oil-carrying pipeline by screwed fittings, bolted flanges or other suitable fastening means at its respective ends. So-called spider strut supports extend transversely at each end of the valve housing to permit fluid to flow therethrough, and thence through the housing, and to provide means for mounting the respective outer ends of a pair of internally extending, axially aligned hollow tubes which together extend the length of the housing, and support a fixed partition element therebetween. The partition is thus mounted centrally of the housing, and has oppositely projecting axial shafts which respectively receive the inner ends of the hollow tubes which support it. Each shaft has an L-shaped fluid conduit therein which provides a passage therethrough communicating with the attached hollow tube for conducting fluid from the tube on one side to the opposite side of the partition. The partition is thus disposed in fixed position, and centrally within the cylindrical interior cavity of a valve member or plug which is mounted on the axially aligned tubes for reciprocally slidable movement relative to the partition within the tubular housing. The partition thus acts as a fixed piston on which a movable cylinder is mounted, for a purpose to be described.

The diameter of the movable plug is smaller than the interior diameter of the housing to accomodate the normal flow of system fluid therearound and through the length of the housing. Its exterior surface is tapered inwardly towards both of its ends, and a centering spring is mounted on one or both of its ends, extending to the adjacent spider strut support, to maintain the plug at its normal centered position with respect to both the housing and the fixed partition during normal fluid pressure and flow conditions.

Respective valve seats are provided to receive the slidable plug at each end of the housing so that the valve is closable in either direction. Each valve seat is formed by an area-constricting nozzle block whose shape matches the end taper of the plug at that end, thus to receive the latter in seating engagement. The open central area of each nozzle and the area surrounding the movable plug provide a fluid flow passage of generally equal cross-sectional area through the housing and around the plug when the plug is in its usual, centered location therein. The seating of the plug against either nozzle as it moves in response to a pressure drop in the line on one side of the valve or the other cuts off flow through the housing from one end or the other.

More specifically, under normal operating fluid pressures or flow conditions through the check valve housing, the movable plug remains centered. Upon rupture or significant leakage of the fluid conduit on either side of the valve housing, closing action of the valve in direction towards the rupture is promoted both by line pressure exerted from the intact side of the valve on the valve plug exterior and through the hollow tube into the central cavity of the plug on the side of the valve partition towards the rupture, and by the draining of fluid from the plug cavity on the opposite side of the partition via the hollow tube extending towards the pipe break. The presence of any gas within the movable plug chamber, such as entrapped air, will not detract from the reliable operation of the valve. When the leak has been repaired, oil is introduced and pressurized via conventional bleed ports or manual valves within the repaired length of conduit. This oil pressure acts against both of the now closed two-way valve which have isolated the broken length so as to reopen them, and to reestablish normal fluid flow and pressure conditions within the entire cable feeder line.

DETAILED DESCRIPTION OF PREFERRED EMBODIMENTS

These and other objects, features and advantages of the invention will become more readily apparent from the following detailed description of the invention, when taken with reference to the accompanying drawings, in which:

FIG. 1 is a side sectional view of a two-way piston check valve in accordance with the invention, the section being taken through the longitudinal centerline axis of the valve;

FIG. 2 is a view similar to FIG. 1, but to a reduced scale and showing the valve plug seated at the left side of the valve;

FIG. 3 is a view similar to FIG. 2, but with the plug seated at the right side of the valve, the view also illustrating a modified form of the invention;

FIG. 4 is an end view to the scale of FIGS. 2 and 3, taken transversely across the valve axis, and showing one of the two cruciform spider strut elements which support the pair of central hollow valve tubes;

FIG. 5 is a fragmentary illustration, to a reduced scale, of a typical oil-filled electric power cable having two of the two-way valves of the invention therein for isolating a predetermined length of the cable.

Figure 6:
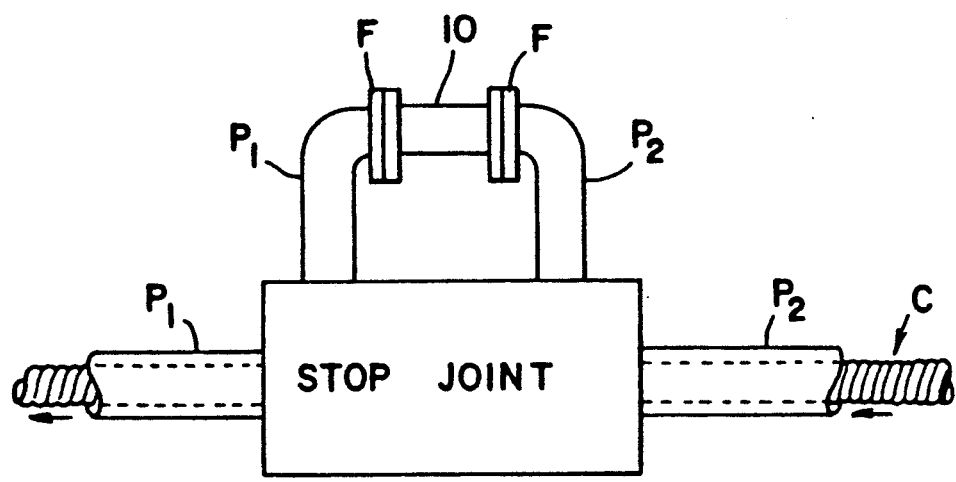
FIG. 6 is a schematic illustration of a stop joint and fluid bypass pipe as conventionally employed at spaced locations along the length of an oil-cooled electric power cable C.

Referring to FIG. 1, the two-way piston check valve of the invention is generally designated by reference numeral 10. The valve is mounted as one of several within a fluid flow conduit P, as indicated in FIG. 5, with each valve housing 11 extending between the ends of two consecutive pipe sections $P_1$ and $P_2$ of the conduit or flow line P. The valve 10 of the invention is located in a bypass pipe through which the oil in pipe sections P1 and P2 is diverted at a conventional stop joint as shown in FIG. 6. The electrical cable C, which can have the usual insulating sheath, passes through the stop joint, while the cooling oil is diverted through the valve 10 in the bypass pipe. The ends of the conduit sections $P_1$ and $P_2$ and the respective attachment ends 11a, 11b of the cylindrical valve housing 11 are shown as being provided with radially extending flanges F for securing the valve 10 between the pipe sections $P_1$ and $P_2$ using flange bolts (not shown). Other suitable means such as threaded collars or pipe clamps could be used in place of the bolted flanges F. Although its internal components as will be described reduce its cross sectional area, the cylindrical vale housing 11 could have enlarged shape to essentially provide the same internal cross-sectional area as each of the pipe sections $P_1$ and $P_2$.

A cylindrical spider strut support, generally designated by reference numeral 12, is mounted as by a threaded connection 11c within and spanning across each end of the valve housing 11. Each support 12 has an outer ring 12a, shown as threadedly interfitted by the threaded connection 11c within the end of the housing 11, so that each support is mounted in fixed position at an end of the housing. A plurality of transverse struts 12b (four shown in FIG. 4) extend radially from the outer ring 12a to a central inner ring 12c of the support 12, so that fluid flow through the pipes $P_1$, $P_2$ passes between the struts and through the valve 10. Each inner cylindrical ring 12c has a tubular opening 16 and receives and supports the outer end of one of the two fixed hollow cylindrical tubes 15a, 15b which extend in axial alignment with each other centrally within the housing 11. Each inner ring 12c also has an inwardly directed annular lip portion 12d at its outer facing end, against which the end of its associated tube 15a or 15b abuts, preventing longitudinal movement of the tube with respect thereto. The respective inner ends of the tubes 15a, 15b are received on the respective ends of the axially and oppositely projecting cylindrical shafts 19a, 19b of a disc-shaped partition 19, as shown in FIG. 1, so that the fixed tubes 15a, 15b retain the partition 19 in rigidly fixed position within the housing 10.

Mounted for axial slidable movement on both of the aligned tubes 15a, 15b and on the centrally located partition 19 is a plug 17 having a cylindrically shaped, hollow interior chamber 27 within which the partition 19 is situated. The partition 19 and chamber 27 thus function as a fixed piston and reciprocally movable cylinder arrangement, for the purpose to be described.

The respective regions 17a, 17b, of the movable valve member or plug 17 are tapered inwardly towards the respective outer surfaces of the tubes 15a, 15b from a convexly contoured, enlarged central region 18 which has considerably greater diameter than that of the end regions. The plug 17 is shown as consisting of two interfitting parts 17c and 17d, as best seen in FIG. 1 where they are shown joined together by mating threads 17e on the respective inner and outer surfaces of the plug halves 17c and 17d. An O-ring 17f assures a fluid-tight joint between the threaded halves 17c, 17d of the valve body 17. The hollow interior cylindrical chamber 27 of the plug 17 is thus formed by the two plug halves 17c and 17d, and the two-piece construction of the plug 17 allows the interior cylindrical chamber 27 to be mounted for slidable movement on and around the generally disc-shaped valve partition 19, which is fixedly mounted on and transversely of the tubes 15a, 15b, as previously described. A ring-shaped, slidable fluid seal 19c, such as an O-ring, is shown extending around the perimeter of the partition 19, the interior surface of the chamber 27 being slidable thereon.

There are respective annular nozzle block elements 20, each having a spreaded V-shape cross-sectional configuration as shown, within and spaced by the respective spider strut supports 12 from each end of the housing 11 and between which the plug 17 moves from its central position as seen in FIG. 1. Each annular element 20 has an outer cylindrical surface 21 which is fitted and sealed tightly within the housing 11, and a tapered inner surface 22 generally conforming with the tapered end of the plug 17 which will seat thereagainst when the plug moves to its end. These nozzle elements thereby form respective valve seats for the plug at each end of the housing 11. The opposite surfaces 23 of the valve seat elements 20, which face outwardly of the housing and towards the respective spider supports 12, can be tapered like the surfaces 22 for smoothing any flow of fluid into the housing from the pipe sections $P_1$ or $P_2$. That is, when the plug 17 is in its central position as shown in FIG. 1, the annular elements 20 serve as nozzle passages to smooth the fluid flow to and from the annular, substantially constant cross-sectional areas between the outer surface of the plug and the interior surfaces of the nozzle elements 20 which, in this context, form respective parts of the interior surfaces of the housing 11. The annular elements 20 are spaced apart and held longitudinally in their respective positions by an annular spacer ring 24 located between them centrally of the housing 11, and by the respective spider rings 12 at the outer ends of the housing 11, as will be understood from FIG. 1. It will be noted that the length of the valve chamber 27 must be at least equal to the sum of the permissible distances of movement of the valve member 27 in either direction, with additional length to accomodate the thickness of the partition 19.

As is apparent from the several drawing figures, the elements of the valve assembly are generally symmetrically arranged about the partition 19. The partition 19 and its shafts 19a, 19b have respective fluid passages 25 and 26, each preferably L-shaped and each having an axial length portion 25a or 26a, respectively, and a radial length portion 25b or 26b, respectively. These passages 25, 26 convey fluid between the open, outer ends of either tube 15a or 15b, as the case may be, and that one of the communicating interior half-sections 27a or 27b of the cylindrical plug chamber 27 which is on the opposite, or remote side of the partition 19. Line fluid pressure in pipe section $P_2$ thus pressurizes the zone or chamber section 27a by way of the shaft passage 26 and the hollow tube 15b leading thereto at the right side of FIG. 1, and line fluid pressure from pipe section $P_1$ pressurizes the other chamber section 27b through the tube 15a at the left side of FIG. 1 by way of the connecting shaft passage 25. The plug 17 is slidable on the tubes 15a, 15b, so that it is free to move to the left or right in the sense of FIG. 1, and it is seen that its chamber 27 constitutes a reciprocally movable cylinder acting on a fixed piston as is provided by the partition 19.

FIG. 2 shows the plug at its extreme left position closing the valve 10 at the pipe $P_1$ in response to a loss of fluid pressure within pipe $P_1$ as the result of a break or leak therein. Alternatively, FIG. 3 shows the plug 17 at its extreme right position closing the valve 10 at the pipe $P_2$, where it moves under the influence of back pressure from the downstream fluid as indicated by dashed arrowhead line $A_2$ upon a break or leak and consequent drop in line pressure within the pipe $P_2$ on the right side of the valve 10. In either case, the plug seats itself against one or the other of the annular valve seats 22 provided by the elements 20, cutting off fluid flow through the valve.

The helical, coiled spring 29 extends between one end of the plug 17 and the inner ring 12c of the spider support 12 at the left side of the valve 10 as seen in the drawings. The plug 17 has a stepped portion at 30 to receive an end of the spring 29. The inner ring 12c can also have a step 31 for receiving the outer end of the spring 29. A similar arrangement of another spring 29a, shown only in FIG. 3 as a modified form of the invention, can be employed at the opposite end of the valve 10 to balance the arrangement.

Under normal conditions, the spring 29 (together with the spring 29a if such is provided) biases the valve member or plug 17 against the normal fluid pressure A and retains the valve 10 in its fully opened condition as seen in FIG. 1 as the fluid, such as oil, either exerts static pressure or actually flows in the direction of arrow A from right to left through the valve 10. The spring 29 is then only slightly compressed under the normal pressure of the fluid acting against the opposite (right) side of the plug 17, under normal operational conditions with the valve fully open. In other words, the spring 29 exerts sufficient resistance to the fluid pressure exerted toward the downstream (left) side to maintain the plug 17 centered within the valve 11 as shown in FIG. 1.

Explaining the checking action of the valve 10, in the event of a rupture in the conduit $P_1$ downstream (left side) of the valve 10, the pressure downstream will drop, and the drag force exerted by the fluid A on the exterior of the plug 17 will increase, as will the pressure difference across the fixed partition 19 due to the aforementioned line pressure flow through the tube 15b from the upstream side (right side) of the valve 10, which passes through the passage 26 and pressurizes the chamber section 27a on the downstream side of the fixed partition 19. Thereupon, the valve member 17 moves to the left as shown in FIG. 2. Contemporaneously, the fluid within the upstream chamber section 27b empties to the downstream tube 15a. These forces move the plug 17 against the tapered surface 22 of the valve seat element 20 at the left side, the interior surface of the chamber 27 sliding on the seal 19c of the piston or partition 19 as indicated in FIG. 2, and overcoming the bias resistance of the spring 29. The valve 10 is then closed and continues to be held closed by the fluid pressure A both outside the plug 17 and within its chamber section 27a, preventing further loss of fluid from the upstream pipe section $P_2$, although the outer, downstream end of tube 15a remains open via the spider support opening 16.

If a break occurs in pipe section $P_2$ on the upstream side (right side) of the valve 10 when the valve is in its normal, open position (FIG. 1), the upstream line pressure A will drop and the pressure differential across the partition 19 will be reversed, as will the drag force on the exterior of the plug 17. That is, with reference to FIG. 3, when the fluid pressure or flow from the pipe section $P_2$ reduces or ceases, line pressure within both the tube 15b and valve chamber 27a is reduced relative to the fluid back pressure $A_2$ within the downstream pipe section $P_1$, so that the direction of fluid flow reverses responsive to the new differential pressure, as indicated by the dashed arrowhead line $A_2$ in FIG. 3. Of course, the normal exterior drag pressure from the upstream side on the movable valve plug 17 also ceases, so that the plug 17 is free to move slidably to the right along the tube 15a, 15b under the downstream fluid pressure $A_2$. Momentary flow $A_2$ from the downstream end of the valve 10 passes through the spider support 12 to exert exterior drag pressure on the plug 17. Additional downstream fluid $A_2$ enters of the left side spider support opening 16 and valve tube 15a, passes through the partition passage 25, and enters and pressurizes the valve member chamber section 27b on the opposite (right hand) side of the partition 19. Contemporaneously with the movement of the valve member 17 to the right, fluid from the left-side chamber 27a bleeds, via the partition passage 26 and upstream tube 15b, into the upstream pipe section $P_2$ which is under reduced or zero pressure due to the leak or break on that side of the valve. The plug 17 moves to the right in the sense of the drawing as illustrated in FIG. 3, sliding on the seal 19c of the partition 19 and engaging the valve seat 22 on that end of the valve 10, whereupon the valve is closed on the upstream side. The back pressure $A_2$ in the line $P_1$ retains the valve 10 in its closed position. It will be noted that the outer end of tube 15b remains open to line $P_2$ even though the valve is closed at that end.

As might be desired in some applications the spring 29a (FIG. 3), similar to the spring 29, may be installed on the upstream side of the plug 17, in which case the valve 10 will be fully symmetrical in structure and operation. The employment of springs on both sides of the plug 17 allows the valve to be oriented either horizontally or vertically or angularly as determined by its line location, so that it may be mounted anywhere within a meandering line of piping, yet the valve will close properly in either direction. It will be noted that any tendency of the closed valve to open or leak will create a reactive, valve closing force, by reason of the pressure exerted on the valve plug from the pipe section on the opposite side via tube 15a or 15b.

When the break or leakage on either side $P_1$ or $P_2$ of the valve 10 has been repaired, the lost fluid is replaced and the fluid is pressurized therein through either a conventional bleedport 34 or a manual valve 35 (FIG. 5) which are normally within the restored line section for usual maintenance purposes. The increased line pressure exerted through the open end of the tube 15a or 15b from that side will pressurize the chamber 27b or 27a on the opposite side of the partition 19 so as to reduce the pressure differential across the latter. The build-up of pressure within that chamber will cause the valve plug 17 to move in that direction, thereby opening the valve. Fluid bleeds from the opposite chamber section appropriately as the valve opens. As pressure is restored and equalized on both sides of the valve 10, the valve is again opened to its normal fully open position as shown in FIG. 1.

Also shown in the drawings are passages 32 extending radially through the annular nozzle elements 20 at their respective narrow necks 20a and leading to respective exterior tubes 33 for connection to pressure gauges (not shown), which may be employed to monitor fluid pressures at the nozzles 20a (FIG. 1) of the valve 10.

Although the preferred forms of the two way piston check valve described in detail and shown in the drawings are especially suited for use in connection with oil-filled electrical power transmission cable lines in which the fluid is contained at relatively high pressure, other applications may suggest themselves to those acquainted with the art.

What is claimed is:

1. A fluid-filled electric power cable system of the type having an upstream direction and a downstream direction with reference to the direction of fluid flow and pressure therein, and comprising a cable which has an insulated conductor surrounded by a fluid conduit with a stop joint and a fluid bypass pipe at the stop joint having at least one two-way fluid check valve therein, said two-way check valve being automatically closable towards either said upstream or said downstream direction responsive to a reduction of said fluid pressure in that direction of said valve, and automatically openable responsive to restoration of said fluid pressure in that direction of said valve.

2. A fluid-filled electric power cable system according to claim 1, wherein said cable includes a substantially vertically extending length portion thereof, said at least one of said two-way fluid check valve being disposed within a fluid by-pass pipe at said vertical length portion of said cable.

3. A fluid-filled electric power cable system of the type having an upstream direction and a downstream direction with reference to the direction of fluid pressure therein, and comprising a cable which has an insulated conductor surrounded by a fluid conduit with a stop joint and a fluid bypass pipe at the stop joint housing at least one two-way fluid check valve therein, said two-way check valve being automatically closable towards either said upstream or said downstream direction responsive to a reduction of said fluid pressure in that direction of said valve, and automatically openable responsive to restoration of said fluid pressure in that direction of said valve, wherein said at least one two-way fluid check valve comprises a valve housing having respective opposite ends attached within a fluid bypass pipe of said cable system and permitting flow of said fluid therethrough, respective annular valve seats at said housing opposite ends, a valve plug member reciprocally movable within said housing between respective first and second valve-closed positions against each of said valve seats, respectively, and a valve-open position between and spaced away from each of said valve seats, said valve plug member when in its said valve-open position permitting fluid communication therepast between said housing opposite ends, said valve plug member having an interior chamber for receiving said fluid therein, and means mounting said valve plug member for said reciprocal movement alternately between said valve-open position and either of said first and second valve-closed positions, said mounting means comprising a fluid-tight partition mounted in fixed position transversely of said housing and within said valve plug member chamber to provide respective substantially equal chamber portions on the opposite sides thereof when said valve plug member is in its said valve-open position, and respective fluid conduits each extending, respectively, between one of said valve plug member chamber portions and that one of said housing ends which is on the opposite side of said partition from the chamber portion from which the conduit extends, each of said fluid conduits remaining open when said valve plug member is in any of its said valve-open position and either of its said valve-closed positions, said valve plug member being mounted for slidable reciprocal movement on said partition and on said mounting means from its said valve-open position to either one of its said first and second valve-closed positions responsive to a fluid leak in said cable and consequent reduction of fluid pressure adjacent to said one valve-closed position, said valve plug member movement being induced by fluid pressure exerted from the opposite end of said housing both on said valve plug member and within that chamber portion adjacent to said one valve-closed position via its associated one of said fluid conduits, the fluid within the other of said chamber portions contemporaneously emptying into said cable adjacent to said one valve-closed position.

4. A fluid-filled electric power cable system according to claim 3, wherein said valve plug member is mounted to move within the housing slidably from its said one valve-closed position to its said valve-open position responsive to increased fluid pressure adjacent to said one valve-closed position, said increased fluid pressure being exerted on said valve plug member and within the other of said chamber portions via its associate done of said fluid conduits, the fluid within said chamber portion adjacent to said one valve-closed position contemporaneously and partially emptying into said cable adjacent to said opposite end of the housing.

5. A fluid-filled electric power cable system according to claim 4, wherein said fluid conduits comprise a pair of tubes extending axially of said valve housing each from one of said opposite ends thereof to one of the opposite sides of said partition, means attaching each said tube to said partition, apertured means for permitting passage of said fluid at each of said housing opposite ends and supporting the respective of said tubes centrally thereof, and respective fluid passages each extending from one of said chamber portions through said partition and into fluid communication with that one of said pair of tubes which is on the opposite side of said partition from the chamber portion from which the fluid passage extends.

* * * * *

UNITED STATES PATENT AND TRADEMARK OFFICE
CERTIFICATE OF CORRECTION

PATENT NO. : 5,280,131
DATED : January 18, 1994
INVENTOR(S) : Claude A. Sarro

It is certified that error appears in the above-indentified patent and that said Letters Patent is hereby corrected as shown below:

Column 8, line 21, after "joint" insert --having--; delete "hous-"; line 22, delete "ing".

Column 9, line 16, "ate done" should read --ated one--.

Signed and Sealed this

Twenty-sixth Day of July, 1994

Attest:

BRUCE LEHMAN

Attesting Officer    Commissioner of Patents and Trademarks